May 1, 1928.

E. V. R. GARDNER 1,668,451

METHOD OF COVERING THE BEDS OF BODIES OF WATER

Filed Oct. 19, 1927

E. V. R. Gardner
Inventor

By C. A. Snow & Co.
Attorneys.

Patented May 1, 1928.

1,668,451

UNITED STATES PATENT OFFICE.

EMMET V. R. GARDNER, OF NEWTON, NEW JERSEY.

METHOD OF COVERING THE BEDS OF BODIES OF WATER.

Application filed October 19, 1927. Serial No. 227,299.

This invention relates to a method whereby the beds or bottoms of bodies of water can be covered with clean sand gravel or fine crushed stone so that undesirable deposits accumulating over a period of time can be entirely covered thus to render the bed of the body of water clean and smooth so as to be particularly desirable for use by bathers or to make the water more potable.

It is well known that the bottoms of ponds, lakes, and rivers used for bathing purposes, are rough and soon become dirty and the bodies of water are thereby made unfit for bathing or potable purposes. This objection has heretofore been partly overcome by dumping sand into the water at different points in an effort to cover the bottom. Such efforts have not been particularly successful, however, because of the difficulty and expense incident to scattering the sand gravel or finely crushed stone evenly over the bottom of the body of water. Large scows or the like for holding sand, gravel or fine crushed stone are not always available and even if they are used considerable guess work must be used in spreading the sand, gravel and fine crushed stone. Unless large scows or the like are available the sand gravel or finely crushed stone can only be delivered by carrying it in small boats and dropping it onto the bottom of the body of water, this being a tedious and laborious undertaking.

It is an object of the present invention to provide a simple method designed primarily for use in localities which experience freezing weather during the winter, the method providing a simple and efficient means whereby the sand, gravel or crushed stone can be spread evenly over the bottom of the body of water, the cost of the operation being reduced to a very low figure.

With the foregoing and other objects in view the invention consists in certain steps in the method hereinafter described and pointed out in the claims, it being understood that various changes may be made therein without departing from the spirit of the invention as claimed.

In the accompanying drawing two steps in the method of covering the bottom of the body of water have been illustrated.

In said drawings.

Figure 1:
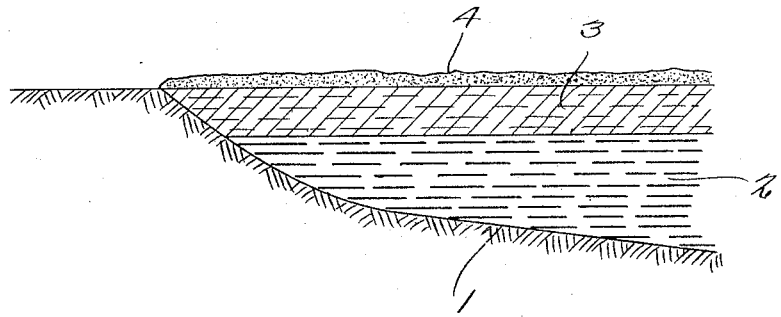
Figure 1 is a section showing a body of water having a frozen surface on which clean sand, gravel or fine crushed stone has been spread.
Figure 2:
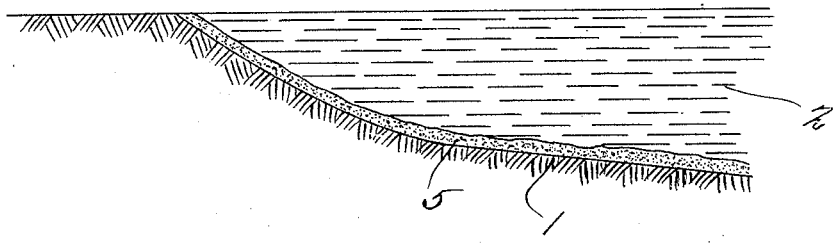
Figure 2 is a similar view showing a body of water from which the ice has melted, thereby allowing the sand, gravel or fine crushed stone to be deposited evenly on the bottom of the body of water.

Referring to the figures by characters of reference 1 designates the bottom or bed of a body of water 2. Assuming that the bed 1 has accumulated an undesirable amount of dirt so as to render the water objectionable for bathing or potable purposes, the surface of the water is allowed to freeze during the winter season and after it has attained a sufficient thickness to support a desired load, this ice, which has been indicated at 3, is provided with a covering of clean sand, gravel or fine crushed stone indicated at 4. The sand, gravel or fine crushed stone can be dumped on the ice and readily spread thereover after which it can be left untouched. Here it will remain until the weather moderates sufficiently to cause the ice to melt at which time the sand, gravel or fine crushed stone will gradually be released and gravitate quietly to the bed or bottom of the body of water where it will form a smooth uniform covering of clean sand, gravel or fine crushed stone as shown at 5 in Figure 2.

If desired salt or other materials tending to expedite the thawing action of the ice can be mixed with the sand, gravel or fine crushed stone.

It has been found in practice that the method herein described is especially desirable for use in covering the bottoms of bathing pools, ponds and the like used in outdoor resorts or bodies of water used for potable purposes.

What is claimed is:

1. The herein described method of covering the bottom of a body of water which consists in spreading a covering of clean sand, gravel, or fine crushed stone over the frozen surface of the body of water whereby, when the ice melts, the sand, gravel, or fine crushed stone will be spread evenly upon the bottom of the body of water.

2. The herein described method of covering the bottom of a body of water with clean sand, gravel or crushed stone which consists in allowing the surface of the body of water to freeze, and spreading thereover a layer of clean sand, gravel, or fine crushed stone, having mixed therewith a material for facilitating the melting of the ice, whereby, when the ice melts, the sand, gravel, or fine crushed stone will be spread on the bottom of the body of water to provide a smooth covering and a purifying effect.

In testimony that I claim the foregoing as my own, I have hereto affixed my signature.

EMMET V. R. GARDNER.